May 26, 1925.

L. A. GIRARD

OSCILLATION DEADENING DEVICE

Filed April 27, 1921  5 Sheets-Sheet 1

Inventor
L. A. Girard,
By Markes Clerk
Attys.

May 26, 1925.

L. A. GIRARD 1,539,557

OSCILLATION DEADENING DEVICE

Filed April 27, 1921   5 Sheets-Sheet 3

Inventor
L. A. Girard
By Marks & Clerk
Attys.

May 26, 1925. 1,539,557
L. A. GIRARD
OSCILLATION DEADENING DEVICE
Filed April 27, 1921 5 Sheets-Sheet 4

Inventor
L. A. Girard
By Marks & Clerk
Attys.

May 26, 1925.                                              1,539,557
                    L. A. GIRARD
             OSCILLATION DEADENING DEVICE
              Filed April 27, 1921        5 Sheets-Sheet 5

Inventor
L. A. Girard
By Marks & Clerk

Patented May 26, 1925.

1,539,557

UNITED STATES PATENT OFFICE.

LOUIS ALEXANDRE GIRARD, OF PARIS, FRANCE

OSCILLATION-DEADENING DEVICE.

Application filed April 27, 1921. Serial No. 464,965.

*To all whom it may concern:*

Be it known that I, LOUIS ALEXANDRE GIRARD, a citizen of the French Republic, and a resident of the city of Paris, France, have invented an Oscillation-Deadening Device, of which the following is a full, clear, and exact description.

This invention relates to a device adapted to progressively deaden mechanical oscillations, particularly applicable for obtaining a progressive braking of the yielding and rebound of the suspension springs for motor vehicles.

The invention is particularly adapted to ensure a braking action which is always progressive, whatever may be the direction of the relative displacement of the suspended part and of the non-suspended part of the vehicle and whatever may be their initial relative position, except for the relative displacement removing the suspended part from the non-suspended part and starting from a determined position, in which there is then juxtaposition of constant braking and progressive braking or solely constant braking.

The new device which is an improvement of the deadening device forming the subject-matter of French Patent No. 514,770 dated 30th April 1920, is essentially characterized by a chamber filled with a suitable liquid, oil, glycerine, etc., divided in two compartments by a movable partition forced, through a suitable operating device, to reproduce, according to a determined law, the relative displacement of the suspended part of the vehicle and of the non-suspended part. These two compartments communicate with another constant volume chamber, also filled with liquid, forming a passage chamber permitting the easy return of the liquid issuing from the compartment which diminishes in volume, into that which increases in volume. The two compartments chamber and the passage chamber are connected by various passages or orifices, arranged in a suitable manner relatively to the zone of displacement of the movable partition, and some of which are adapted to produce the progressive braking and the others the reentrance without resistance of the braking liquid. This two compartment chamber and this passage chamber are shut to the atmosphere.

If X designates the passage chamber and Y and Z the two compartments separated by the movable partition, the compartments Y and Z are in permanent communication with the chamber X, except in the limit cases indicated hereafter, through orifices arranged in such a manner that, when any displacement of the partition takes place, the section of permanent communication between the chamber X and the compartment which diminishes in volume diminishes also, and the section of permanent communication between the chamber X and the compartment which increases in volume increases also. In the limit positions, the section of communication of a compartment of variable volume with the chamber X can become null.

In addition to these orifices, other orifices are provided for establishing on the one hand a communication between the chamber X and the compartment Y and, on the other hand, between the chamber X and the compartment Z, these orifices being provided with suitable members for permitting the passage of the liquid only from X to Y and from X to Z and in that direction only.

Consequently, the cycle effected by the liquid is the following: If the movable partition moves, for instance, in such a direction that the compartment Y diminishes, the liquid driven from this compartment passes through the permanent orifices, the cross section of which decreases in proportion to the displacement of the partition, into the chamber X, by progressively braking the movement of the partition; as the liquid passes from the compartment Y into the chamber X, the same quantity of liquid passes from the chamber X into the compartment Z, on the one hand through the permanent communication orifices, on the other hand through the orifice which permits the passage in that direction only. When the reverse movement of the partition takes place, the circuit described by the liquid is effected in the same conditions, but reversely.

The permanent orifices may, moreover, be combined in such a manner that the movements of the movable partition are subjected to a different braking action according to the direction.

The purpose of the orifices provided with members permitting the passage of the liquid only from the chamber X into the compartments, is to ensure the progressive braking in both directions.

On the other hand, a property of these orifices is to permit, according to their cross section, of obtaining a determined pressure in the chamber X, pressure which may be null. As is obvious this chamber is to be placed about the stuffing-box or stuffing-boxes ensuring the tightness of the apparatus.

In the portion of the device where the movement of the movable partition takes place, corresponding to the fall of the non-suspended part of the vehicle in a hollow of the road, an orifice may be provided which ensures the direct communication between the variable volume compartments, for the purpose of diminishing the braking of the movement in that portion of the stroke.

Another improvement consists in dividing the circular casing of the apparatus into two parts by a fixed diametrical partition and in arranging in these parts two paddles in alignment with each other, so that the apparatus is double and formed of two symmetrical parts, this having the advantage of balancing the stresses in a more precise manner and of doubling the useful effect without increasing the dimensions of the apparatus.

In the accompanying drawings, given by way of example only.

Figure 1:
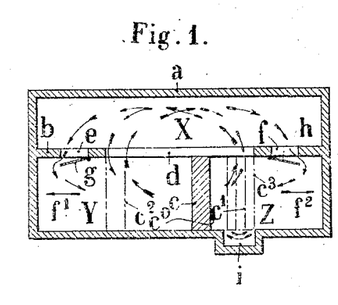
Fig. 1 is a diagram illustrating the principle of the invention.

Referring to Fig. 1, it will be seen that the three chambers or compartments X, Y, Z are formed, for instance, in a box $a$, divided by a fixed partition $b$ and having a movable partition or piston $c$. The two compartments Y and Z are in communication with the chamber X through a narrow port $d$, along which moves the piston $c$. The compartments Y and Z are in communication with the chamber X through orifices $e$, $f$ provided with flap-valves $g$, $h$ opening towards Y and Z. The three chambers or compartments are completely filled with liquid and shut to the atmosphere, as above stated. The compartments Y and Z are in direct communication through a passage $i$ when the piston reaches the piston $c^1$.

The operation is as follows:

The piston $c$ being forced to reproduce the relative movements of the suspended part and of the non-suspended part, this piston moves sometimes in the direction of the arrow $f^1$; sometimes in the direction of the arrow $f^2$. The control device is such that when a shock causes the spring to yield, this piston moves in the direction of the arrow $f^1$, the liquid is compressed in the compartment Y, the pressure closes the flap-valve $g$ and forces the liquid to pass in the chamber X through the portion of the port $d$ in front of the piston.

The extent of this portion of the port diminishes in proportion to the displacement of the piston, so that the value of the breaking action progressively increases up to the infinite, when the piston reaches the limit position $c^2$.

From the constant volume chamber X the liquid passes into the compartment Z through the orifice $f$ and the flap-valve $h$ which it opens since the chamber X was already full of liquid and that the increase in volume of the compartment Z exactly corresponds to the diminution in volume of the compartment Y.

In the movement in reverse direction of the partition (arrow $f^2$), which corresponds to the rebound, the liquid compressed in the compartment Z closes the flap-valve $h$, passes through the port $d$ into the chamber X full of liquid and from this chamber returns in the compartment Y through the orifice $e$ by opening the flap-valve $g$. The extent of the port permitting the issue of the liquid from the compartment Z diminishes in proportion to the movement so that, during the rebound as well as during the yielding, the braking is progressive.

When the non-suspended part of the vehicle falls in a hollow of the road, the piston moves from the normal position $c^0$ towards the limit position $c^1$. The liquid compressed in the compartment Z returns in the compartment Y and following the circuit indicated until the piston $c$ is opposite the passage $i$; at this moment, the liquid passes directly from the compartment Z to the compartment Y through this passage $i$. This takes place up to the limit position $c^3$. During this period, the liquid being braked, on the one hand, by the port $d$, the cross section of which continuously decreases, and, on the other hand by the passage $i$ of constant cross section, there is juxtaposition of braking of constant value and of braking of progressive value. In other words, during the phase here involved (movement of the piston from $C^0$ to $C^3$) the liquid encounters several successive resistances in the circuit it traverses, that is, one resistance in passing through the right hand side of the opening $d$; a second very slight resistance in passing through the left hand side of the opening $d$ and valve $e$; and a third resistance at the groove $i$. As the piston moves toward the right, the length of the opening $d$ at the right hand side of the piston $c$ diminishes in proportion and the resistance increases and thus causes a progressive braking. While the piston is opposite the groove $i$, the resistance is constant and the braking produced is constant. The total braking is thus the sum of the resistance at the portion of the slot $d$ on the right hand side of the piston $c$, which is progressive, and that at the groove $i$, which is constant.

Therefore whatever may be the direction of the displacement and the initial position of the movable partition, this displacement is progressively braked by forced passage of oil in a port the cross section of which continuously decreases as long as the movement takes place, which allows, in the application of the device to motor vehicles, of obtaining the essential following results:

1. Free yielding of the spring for the small oscillations.
2. Yielding progressively braked from 0 to the infinite for the heavy shocks.
3. Rebound progressively braked.
4. Flexibility of the spring diminishing in proportion as the load of the vehicle increases.
5. Braking of the rebound reversely proportional to the load.
6. Braking of the yielding proportional to the flattening of the spring caused by use and reversely proportional braking of the rebound.
7. Free relaxing of the non-suspended part when passing in a hollow of the road.

The result No. 4 takes place in the following manner:

If the load increases and the corresponding flexion increases, the piston is moved in its chamber from the position of rest, and from the beginning of a new flexion or distortion due to an obstacle, the resistance of the device is greater. The apparatus thus acts the more energetically as the load is greater. In this connection "flexion" (the amount which the spring distorts) must not be confounded with "resiliency" (the property of yielding elastically). The "rebound" is caused by the expansion of the spring which follows the flexion on passage over an obstacle. The more heavy the vehicle is loaded, the greater the resistance to the rebound, and the less is it necessary to interpose accessory devices to moderate it, as above set forth in result No. 5. These explanations also relate to result No. 6, while it is believed that result No. 7 is self-explanatory.

In the form of construction illustrated in Figures 2 to 6, the apparatus is constituted by a round box or casing $a$ closed by a screwed bottom $j$. The fixed partition $b$ is represented by a disc separating the chamber X from the two compartments Y and Z. The piston or movable partition separating the two compartments Y, Z is a vane $c$ integral with an axis $k$ on which is also secured a lever L (Fig. 6) connected by a link $m$ and a joint $m^1$ to the suspension spring.

Figure 2:
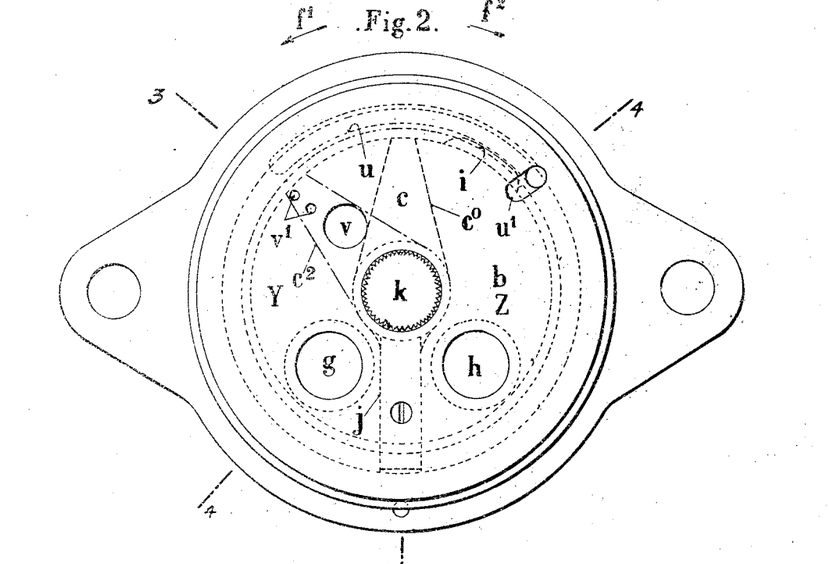
Fig. 2 is a front elevation of one form of the improved device with the cover removed.
Figure 3:
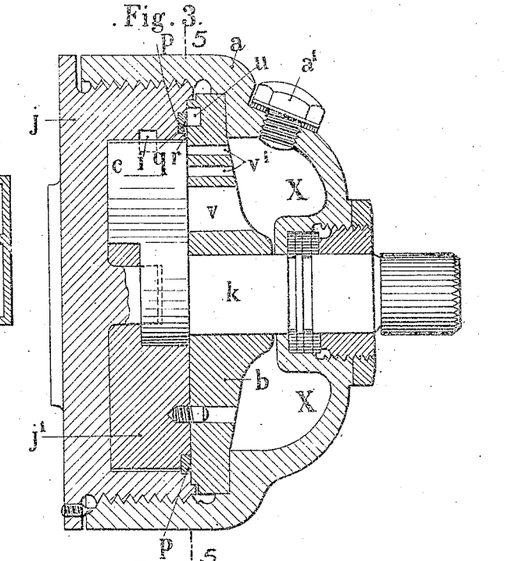
Fig. 3 is a sectional view of the same taken on line 3—3 of Fig. 2.
Figure 4:
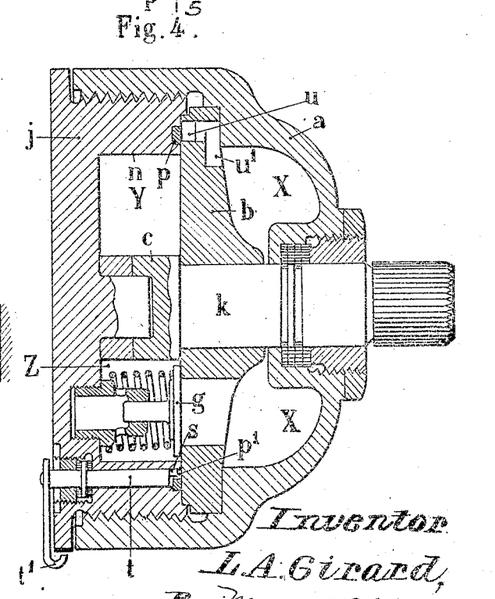
Fig. 4 is a sectional view taken on line 4—4 of Fig. 2.

The two compartments Y, Z are separated on the other hand by a fixed partition $j^1$.

The port $d$ is formed in a special manner. In the front edge of the bottom $j$ (Fig. 3) is provided a circular groove in which is fitted a ring $p$; in this ring are formed notches $q$, which are seen clearly in Fig. 5. Similar notches $r$ are formed in the bottom $j$, between the ring $p$ and the wall $n$.

The ring $p$ can rotate about its axis in its groove so as to cause both series of notches $q$ and $r$ to coincide, or to displace them more or less. For that purpose, the said ring is provided with a notch $p^1$ (Figs. 4 and 5) in which is engaged an eccentric pin $s$ forming a part of a rod $t$ carrying a small operating lever $t^1$. By acting on this lever the ring is moved in one direction or the other and the desired relative position of the notches $q$ and $r$ is determined.

On the other hand, in the disc $b$ is formed a groove $u$, extending according to an arc of a circle, as shown in Fig. 2, and leading to an orifice $u^1$ opening in the chamber X.

In the wall $n$ is also provided a groove $i$ (Figs. 3 and 5) which corresponds to the passage $i$ of the diagram.

Finally, in the wall of the disc $b$ are formed passages $v$ $v^1$ causing the chamber X and the compartment Y to communicate.

The valves $g$ $h$ are valves provided with light springs.

A plug $a^1$ allows the filling up of the apparatus.

The operation is similar to that described with reference to Fig. 1.

Figure 5:
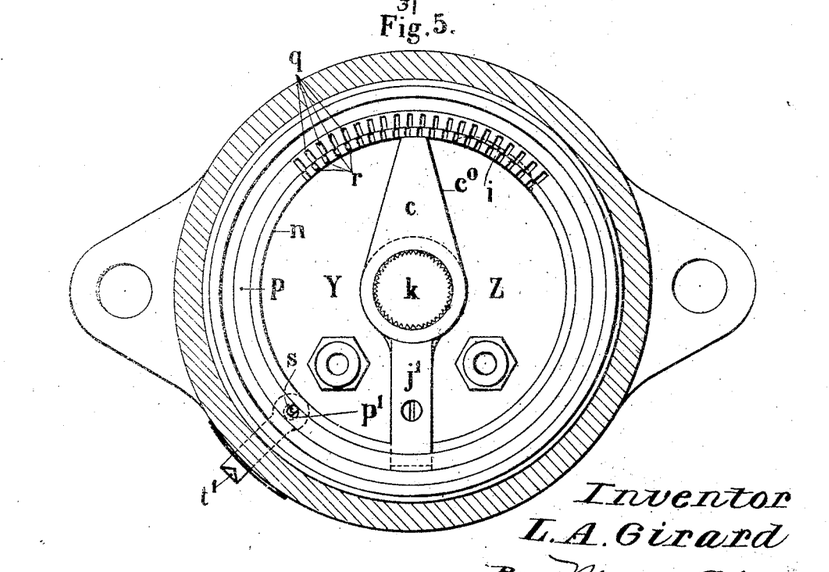
Fig. 5 is a sectional view taken on line 5—5 of Fig. 3.
Figure 6:
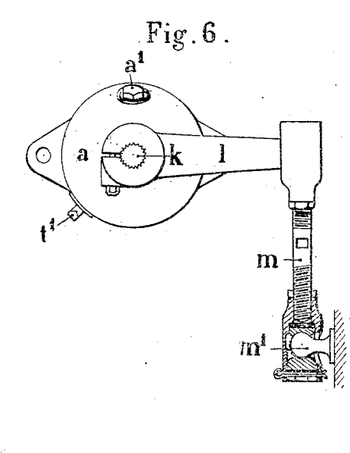
Fig. 6 is a reduced view partly in section, illustrating the manner in which the device is employed.

With normal load and in normal position, the vane is at $c^0$, Figs. 2 and 5.

When the shock compressing the suspension spring takes place the vane moves in the direction $f^1$. The liquid compressed at Y issues through the grooves $q$ $r$ which brake its movement. At the beginning, the resistance opposed to the displacement of the parts is small because the hole $v$, entirely uncovered, allows the direct escape of the oil from Y to X, but this orifice is gradually covered by the vane $c$, at the same time as the number of grooves ensuring the passage of the oil diminishes. It results therefrom that the resistance increases and that the braking is progressive. At the end of the movement, all the passages are closed and the resistance becomes infinite. However, for avoiding hammer strokes, the orifices $v^1$ have been provided, which offer a small passage to the oil at the end of the movement.

When the rebound of the spring takes place, the vane $c$ moves in the direction $f^2$. The resistance is small at the beginning, as all the notches $q$ $r$ serve for the passage of the oil. Their number diminishes also and there is again progressive braking.

When the non-suspended part of the vehicle falls in a hollow of the road, that is to say at the time the vane comes opposite the groove $i$, there is juxtaposition of progressive braking and of constant braking as above set forth.

The oil which passes through the notches $q$ $r$ in both directions of movement is collected in the header $u$ from which it passes, through the orifice $u^1$, into the chamber X. The valves $g$ $h$ operate exactly as already described.

It will be noted that, if the vehicle is more than normally loaded, the spring comes nearer the vehicle, the link $m$ slightly rises (Fig. 6) and the vane moves slightly towards the left (Fig. 2). It results therefrom, as will be easily understood, that in this case the braking is more energetic, the oil passages being diminished from the beginning. It will also be noted that the orifices $v$ and $v^1$ do not come in action when the rebound takes place, as said openings are covered at the beginning of the rebound.

The braking of the rebound is so much the more energetic as the load is smaller.

Figure 7:
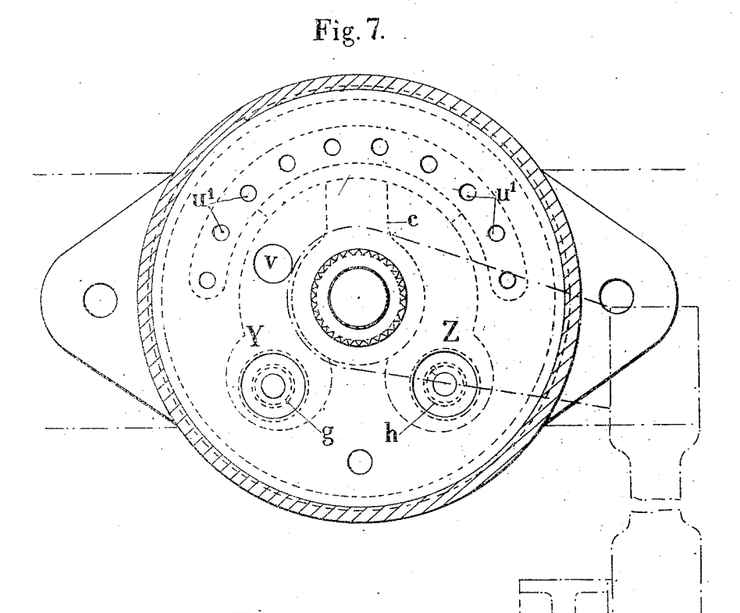
Figs. 7 and 8 are vertical sectional views at right angles to one another, of a modification.
Figure 8:
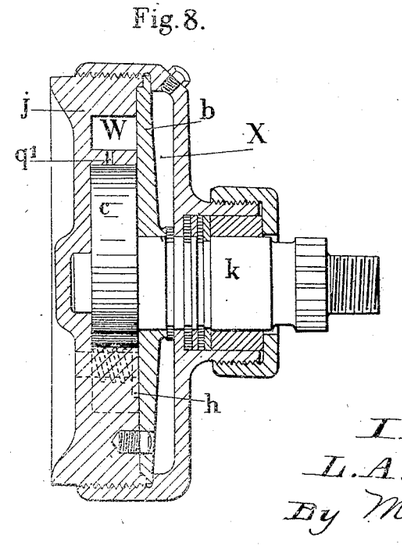

In the modification of Figs. 7 and 8, the chambers Y and Z communicate with an intermediate chamber W through a slot $q^1$; this chamber communicates with the chamber X through a series of holes $u^1$.

The operation is similar to that already described. In this case, it is the passage of the liquid through the slot $q^1$ which produces the braking.

Figures 9, 10, 11:
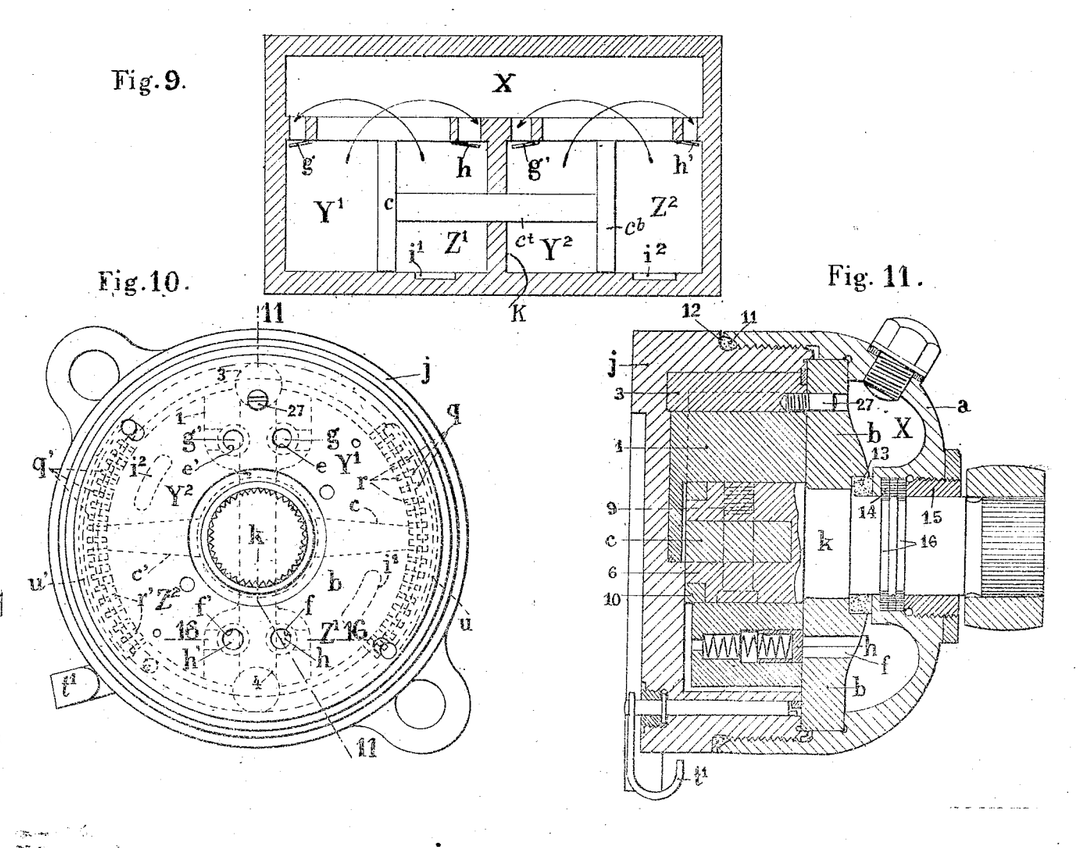
Fig. 9 is a diagram illustrating the principle as employed in the duplex system.
Fig. 10 is a front view with the cover removed, of a duplex device.
Fig. 11 is a sectional view taken on line 11—11 of Fig. 10.
Figure 12:
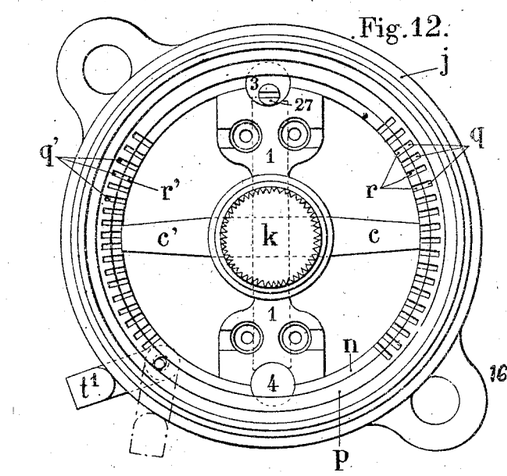
Fig. 12 is another front view of the duplex device with the separating plate removed.

In Fig. 9, the device is double, two pistons $c^a$ and $c^b$ are connected by a rod $c^t$ which passes through the partition K and is connected to the axle of the vehicle. The valves $g$, $h$ are arranged in the pipes $e^1$ and $f^1$ connecting the chambers $Y^1$ and $Y^2$, and $Z^1$ and $Z^2$, so as to cause these chambers to operate in parallel. In this case grooves $i^1$ and $i^2$ cooperate with the pistons.

The construction shown in Fig. 10 is similar to that of Fig. 9 with the exception that the pipes $e^1$, $f^1$ and valve $g$ $h$ are substituted by pairs of valves $g$, $h$, and $g^1$ $h^1$.

Figure 15:
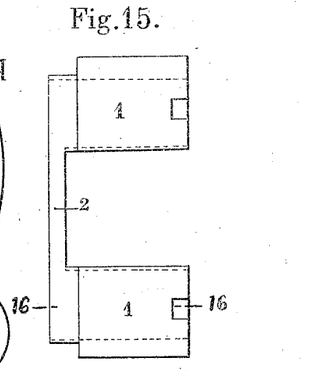
Fig. 15 is a side view of the fixed partition forming part of the duplex device.
Figure 16:
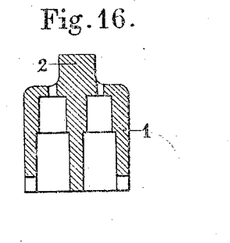
Fig. 16 is a sectional view taken on line 16—16 of Fig. 15.

Referring now specifically to Figs. 10 to 17 inclusive, the casing $j$ is divided into two chambers by a fixed partition 1, shown in detail in Figs. 15 and 16. This partition is of special shape and contains the housings for the valves $g$, $h$, $g^1$ and $h^1$. It is provided with a rib 2 fitting in a corresponding groove in the base of the casing, and acting as a key. Cylindrical keys 3 and 4 fit partly in the ends of the partition 1 and partly in the casing $j$, to aid in securing the partition in position. This arrangement positively fixes the partition in the casing and prevents leakage of the fluid past the partition.

Figures 13, 14:
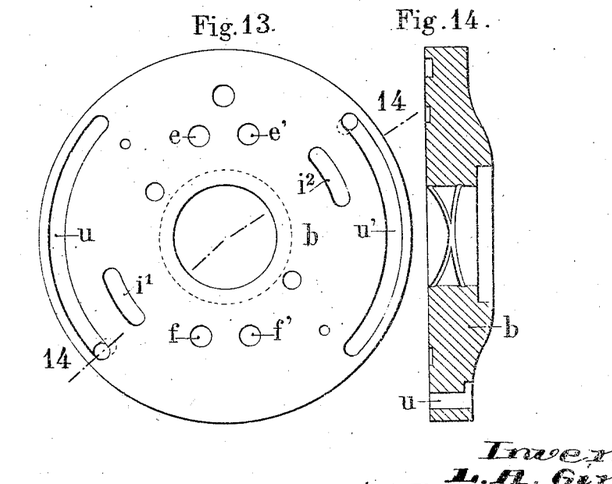
Fig. 13 is a front view of the separating plate which divides the chambers of variable volume from the chamber having a constant volume.
Fig. 14 is a sectional view taken on line 14—14 of Fig. 13.

A partition $b$, shown in detail in Figs. 13 and 14, is connected by a screw 27 to the cylindrical key 3 to prevent the partition $b$ from turning.

Figure 17:
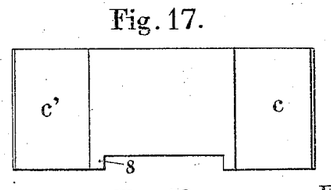
Fig. 17 is a plan view of the double paddle forming part of the duplex device.

The piston or paddle $c$ $c^1$, is duplex in this instance and is shown in detail in Fig. 17. The intermediate portion of this piston fits in a slot formed in a fork 6 arranged at the end of the shaft $k$, as shown in Fig. 11. This paddle is centered on the shaft, by means of the side walls of the recess 8, which engage the outer surface of the shaft $k$ at diametrically opposite points. In order to prevent the paddle $c$, $c^1$ from disconnecting from the fork 6, a hoop 10 may be passed around the shaft and a screw 9 may be inserted through the shaft, or either one of these may be used alone for this purpose.

The treaded cover $a$ of the casing, which locks the partition $b$ on the damper body or casing $j$, is provided at its inner end with a conical bore 11 which bears against a packing ring 12 made of india rubber or cork. The conical shape of the bore facilitates the compression of the packing.

The packing of the inner stuffing box, is constituted by one or more rings 13, made of cork, which are compressed when the cover $a$ is screwed into position. Owing to this arrangement a tight joint may be made about the shaft $k$ and at the inner end of the cover. Neither packing 13 or 12 prevents the clamping of the partition $b$.

The packing 14 of the outer stuffing box is constituting in the same way by one or more rings, of cork or the like, compressed by a nut 15 and fitted in grooves 16 in the shaft $k$, so as to insure a tight joint at this location.

The above arrangements are given by way of example only; the forms, dimensions, materials used and all detail arrangements may of course be varied without departing thereby from the principle of the invention.

Claims—

1. In an oscillatory shock absorber, a chamber filled with liquid, a movable partition dividing said chamber into two compartments of variable volume, ports covered and uncovered by said movable partition, a constant volume compartment into which said ports empty, a stationary partition, and valves arranged in the stationary partition for separating the constant volume compartment from each variable volume compartment.

2. In a shock absorber, a chamber filled with liquid, a movable partition dividing this chamber into two compartments of variable volume, ports covered and uncovered by the movable partition, a constant volume chamber into which said ports empty, valves controlling communication between the constant volume chamber and the two compartments, and a passageway cooperating with said partition to provide a constant outflow means when the partition registers with said passageway.

3. In a shock absorber, a chamber filled with liquid, a movable partition dividing said chamber into two compartments of variable volume, openings arranged in said partition and progressively covered and uncovered by the movable partition, a constant volume chamber to receive liquid passing through said openings, and valves for controlling the passage of liquid between the constant volume chamber and the two compartments.

4. In a shock absorber, a chamber filled with liquid, a movable partition dividing this chamber into two compartments, two openings covered or uncovered by the movable partition, a constant volume chamber receiving liquid through said openings, a partition separating the two compartments from the constant volume chamber, and valves arranged in the last mentioned partition for permitting the passage of liquid from the constant volume chamber into each variable volume compartment.

5. In a shock absorber, a cylindrical chamber filled with liquid, a stationary partition arranged in said chamber and dividing the same into a constant volume chamber and a movable partition chamber, a movable partition rotatably mounted in the movable partition chamber and dividing the latter into two compartments of variable volume, ports arranged in the stationary partition and covered and uncovered by the movable partition, and a passageway cooperating with said movable partition and capable of providing a constant outflow section when the movable partition registers with said passageway.

6. A shock absorbing apparatus including a cylindrical chamber filled with liquid, a stationary partition arranged in the chamber and dividing the same into two compartments, a vane rotatably mounted in one of said compartments and dividing the same into two variable volume chambers, ports arranged in the stationary partition and covered and uncovered by said vane, and valves arranged in said partition for controlling the movement of liquid from the compartment in which the vane is mounted into the other compartment.

7. A shock absorbing apparatus including a cylindrical chamber, a rotatable vane dividing said chamber into two compartments of variable volume, a constant volume chamber juxtaposed to the said cylindrical chamber, radial notches through which fluid is adapted to flow from the variable volume compartments to the constant volume chamber, means for varying the size of these notches, and valve controlled openings for regulating the passage of fluid from the constant volume chamber to the two compartments and vice versa.

8. In a shock absorber, a cylindrical chamber, a rotatable vane dividing said chamber into two compartments of variable volume, a constant volume chamber juxtaposed to the said cylindrical chamber, a stationary partition separating the constant volume chamber from the two compartments, radial notches through which fluid is adapted to flow from said compartments to said constant volume chamber, a ring provided with corresponding notches to cooperate with the other notches, means for adjusting said ring to shift the notches of the ring relatively to the other notches, and valves arranged in said partition for controlling the passage of fluid from the constant volume chamber into said compartments and vice versa.

9. In an oscillating shock absorber, a cylindrical chamber, a rotatable vane dividing it into two compartments, a constant volume chamber juxtaposed to the said cylindrical chamber, a partition separating said chambers, radial notches adapted to serve as braking orifices between the chambers and arranged in two concentric rows, a rotary ring in which one of these rows of notches is formed, means for adjusting said ring for varying the section of the notches, and valves arranged in said partition for controlling the flow of liquid from the constant volume chamber into said compartment.

10. A shock absorbing apparatus including a cylindrical chamber, a rotatable vane dividing said chamber into two compartments, a constant volume chamber juxtaposed to the said cylindrical chamber, a partition dividing said chambers, radial notches adapted to serve as braking orifices arranged in two concentric rows and adapted to permit the passage of fluid from said compartments into said constant volume chamber, a rotary ring in which one of said rows of notches is formed, means for rotating said ring from the exterior of the apparatus in order to vary the section of said notches, and valves arranged in said partition for controlling the passage of fluid from the constant volume chamber into the said compartments.

11. In a shock absorber, a chamber filled with liquid, a movable partition dividing said chamber into two compartments having a variable volume, openings covered and uncovered by said movable partition, a constant volume chamber into which these openings empty, valves formed in the partition separating the constant volume chamber from each of the variable volume chambers, and means to impart to the movable partition movements corresponding to the relative movements of the suspended portion and of the unsuspended portion of the vehicle.

12. In a vibration shock absorber, a chamber filled with liquid, a movable partition dividing said chamber into two compartments of variable volume, openings covered and uncovered by the movable partition, some forming a circular row at the periphery of the variable volume chambers, others provided in the wall separating the constant volume chamber and the variable volume chambers, a constant volume chamber into which these openings empty, valves formed in the partition separating the constant volume chamber from each variable volume chamber.

13. In a shock absorber, a cylindrical chamber, a rotating blade dividing it into two compartments, a constant volume chamber adjacent to the preceding, radial notches intended to serve as brake openings, arranged in two concentric rows variable in position with respect to each other, one of the rows being formed in a rotary ring, valves between the constant volume chamber and the two compartments, a rotating shaft, an eccentric plug engaged in a slot of the ring to permit of rotating the latter.

14. In a shock absorber, several tightly closed chambers filled with liquid, a movable partition dividing one of these chambers into two variable volume compartments, openings covered and uncovered by the movable partition, a constant volume chamber into which these openings empty, valves formed in the partition separating the constant volume chamber from each variable volume chamber.

The foregoing specification of my oscillation deadening device signed by me this 14th day of April 1921.

LOUIS ALEXANDRE GIRARD.